Patented June 3, 1952

2,598,767

UNITED STATES PATENT OFFICE 2,598,767

CELLULOSE ESTER AND N-ALKOXYMETHYL POLYURETHANE REACTED POLYMERS

Carl R. Dolmetsch, Westchester, N. Y., and Samuel B. McFarlane, Union, N. J., assignors to Celanese Corporation of America, New York, N. Y., a corporation of Delaware No Drawing. Application January 4, 1950, Serial No. 136,853

8 Claims. (Cl. 8—129)

1

This invention relates to polymeric materials and relates more particularly to polymeric materials having a basis of cellulose acetate or other organic acid ester of cellulose.

An important object of this invention is the provision of polymeric materials having a basis of cellulose acetate or other organic acid ester of cellulose which will be insoluble in organic solvents such as acetone and which will be resistant to softening at high temperatures.

A further object of this invention is to provide polymeric materials having a basis of cellulose acetate or other organic acid ester of cellulose modified with an N-alkoxymethyl polyurethane.

Other objects of this invention will be apparent from the following detailed description and claims.

As is well known, cellulose acetate and other organic acid esters of cellulose that are in commercial use at the present time are not fully esterified but contain a small proportion of free hydroxyl groups. These partially esterified cellulose esters are readily soluble in organic solvents such as acetone and will soften at temperatures of the order of about 100 to 205° C. which limits their applicability in certain cases. We have now discovered that by reacting the cellulose esters containing free hydroxyl groups with an N-alkoxymethyl polyurethane, the cellulose esters are rendered insoluble in organic solvents such as acetone and are rendered resistant to softening at elevated temperatures thereby expanding their field of use.

In carrying out this invention, the cellulose esters and the N-alkoxymethyl polyurethane may be dissolved in a common solvent and the solution so formed employed for the preparation of films or foils or for the production of filamentary materials such as filaments, yarns, tow, ribbon, straw and the like. The N-alkoxymethyl polyurethane may also be applied to preformed articles having a basis of cellulose acetate or other organic acid ester of cellulose such as filamentary material, fabrics and the like by dipping, padding or spraying, for example. The cellulose esters containing the N-alkoxymethyl polyurethane may then be heated to between about 80 and 150° C. for a period of between about 1 and 12 hours, causing the N-alkoxymethyl polyurethane to react with the free hydroxyl groups in said esters. The products formed in this manner are insoluble in organic solvents such as acetone and are resistant to softening at elevated temperatures. In addition, they possess excellent physical properties and are useful for a variety of applications.

2

The N-alkoxymethyl polyurethanes employed in our invention may be prepared by reacting a polyurethane with formaldehyde to produce the N-methylol polyurethane, which may be reacted further with an aliphatic alcohol such as, for example, methyl alcohol, ethanol or propanol to produce the N-alkoxymethyl polyurethane. From 1 to 90% of the nitrogen atoms in the polyurethane may be substituted with an N-alkoxymethyl group in this manner. Polyurethanes suitable as starting materials are, for example, the polyurethane which may be prepared from 1,6-hexamethylene diisocyanate and 1,4-butanediol, the polyurethane which may be prepared from 1,4-butanediol and 1,4-tetramethylene diisocyanate, the polyurethane which may be prepared from hexamethylene diisocyanate and 1,6-hexanediol; and the polyurethane which may be prepared from 2,4-tolylene diisocyanate and hexanediol.

In addition to cellulose acetate, other organic acid esters of cellulose that may be employed are, for example, cellulose propionate, cellulose butyrate, cellulose acetate propionate and cellulose acetate butyrate. The cellulose esters should contain at least about 0.2 free hydroxyl group per glucose unit and preferably between about 0.2 and 0.8 free hydroxyl group per glucose unit. To obtain the best results, the N-alkoxymethyl polyurethanes may be added to the cellulose esters in an amount of from about 5 to 20% by weight. The cellulose esters may contain plasticizers, ultra-violet light absorbents, fire-retardants and the like; and may have incorporated therein dyes, pigments, nacreous materials and other substances having a decorative effect.

The following examples are given to illustrate this invention further.

*Example I*

A solution containing 30 parts by weight of the polyurethane which may be prepared from 1,6-hexamethylene diisocyanate and 1,4-butanediol dissolved in 110 parts by weight of formic acid and 16 parts by weight of methyl alcohol is heated to 50° C. and poured rapidly into a solution containing 30 parts by weight of paraformaldehyde dissolved in 32 parts by weight of methanol containing 0.5 part by weight of a 20% by weight sodium hydroxide solution. The mixture is held at 50° C. for 15 minutes and poured into 300 parts by weight of water containing 45 parts by weight of concentrated (28%) ammonium hydroxide. A curdy precipitate results, which is redissolved in acetone and reprecipitated with water for purification. There are obtained about 30 parts by weight of the N-methoxymethyl polyurethane having about 45% of its nitrogen atoms substituted with methoxymethyl groups.

Example II

A spinning dope is prepared by dissolving in 73.5 parts by weight of acetone 23.85 parts by weight of a cellulose acetate having 0.6 free hydroxyl group per glucose unit and 2.65 parts by weight of the N-methoxymethyl polyurethane prepared in accordance with Example I. This spinning dope is converted into a yarn by the regular dry-spinning technique and baked for 4 hours at 150° C. The yarn is insoluble in acetone and has a melt point above 300° C.

Example III

The dope prepared in accordance with Example II is cast to produce a film which is baked for 3 hours at 160° C. The film is clear and tough, insoluble in acetone and has a melting point above 300° C.

Example IV

A 10% by weight solution in methanol of the N-methoxymethyl polyurethane prepared in accordance with Example I is padded onto a woven fabric having a basis of cellulose acetate yarns and dyed a navy blue shade. The fabric absorbs 3% by weight of the N-methoxymethyl polyurethane. After baking for 4 hours at 150° C., the color of the dyestuff is not affected and the fabric is completely resistant to glazing during ironing.

It is to be understood that the foregoing detailed description is given merely by way of illustration and that many variations may be made therein without departing from the spirit of our invention.

Having described our invention, what we desire to secure by Letters Patent is:

1. Process for preparing polymeric materials which comprises heating an intimate mixture of a lower aliphatic acid ester of cellulose containing at least about 0.2 free hydroxyl group per glucose unit with an N-alkoxymethyl polyurethane at a temperature of from about 80 to 150° C. for a period of from about 1 to 12 hours.

2. Process for preparing polymeric materials which comprises heating an intimate mixture of cellulose acetate containing from about 0.2 to 0.8 free hydroxyl group per glucose unit with an N-methoxymethyl polyurethane at a temperature of from about 80 to 150° C. for a period of from about 1 to 12 hours.

3. Process for preparing polymeric materials which comprises applying an N-alkoxymethyl polyurethane in an inert liquid medium to a fabric containing yarns formed from a lower aliphatic acid ester of cellulose containing at least about 0.2 free hydroxyl group per glucose unit, and heating the treated fabric at a temperature of from about 80 to 150° C. for a period of from about 1 to 12 hours.

4. Process for preparing polymeric materials which comprises applying an N-methoxymethyl polyurethane in an inert liquid medium to a fabric containing yarns formed from cellulose acetate containing from about 0.2 to 0.8 free hydroxyl group per glucose unit, and heating the treated fabric at a temperature of from about 80 to 150° C. for a period of from about 1 to 12 hours.

5. A polymeric material prepared by heating an intimate mixture of a lower aliphatic acid ester of cellulose containing at least about 0.2 free hydroxyl group per glucose unit with an N-alkoxymethyl polyurethane at a temperature of from about 80 to 150° C. for a period of from about 1 to 12 hours.

6. A polymeric material prepared by heating an intimate mixture of cellulose acetate containing from about 0.2 to 0.8 free hydroxyl group per glucose unit with an N-methoxymethyl polyurethane at a temperature of from about 80 to 150° C. for a period of from about 1 to 12 hours.

7. A textile material prepared by applying an N-alkoxymethyl polyurethane in an inert liquid medium to a fabric containing yarns formed from a lower aliphatic acid ester of cellulose containing at least about 0.2 free hydroxyl group per glucose unit, and heating the treated fabric at a temperature of from about 80 to 150° C. for a period of from about 1 to 12 hours.

8. A textile material prepared by applying an N-methoxymethyl polyurethane in an inert liquid medium to a fabric containing yarns formed from cellulose acetate containing from about 0.2 to 0.8 free hydroxyl group per glucose unit, and heating the treated fabric at a temperature of from about 80 to 150° C. for a period of from about 1 to 12 hours.

CARL R. DOLMETSCH.
SAMUEL B. McFARLANE.

REFERENCES CITED

The following references are of record in the file of this patent:

UNITED STATES PATENTS

| Number | Name | Date |
| --- | --- | --- |
| 2,430,860 | Cairns | Nov. 18, 1947 |
| 2,443,450 | Graham et al. | June 15, 1948 |
| 2,456,271 | Graham | Dec. 14, 1948 |
| 2,462,159 | Brown | Feb. 22, 1949 |
| 2,474,923 | Watkins | July 5, 1949 |